United States Patent [19]
Tanaami

[11] Patent Number: 6,031,661
[45] Date of Patent: *Feb. 29, 2000

[54] CONFOCAL MICROSCOPIC EQUIPMENT

[75] Inventor: Takeo Tanaami, Tokyo, Japan

[73] Assignee: Yokogawa Electric Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/003,068

[22] Filed: Jan. 5, 1998

[30] Foreign Application Priority Data

Jan. 23, 1997 [JP] Japan .................................... 9-009991

[51] Int. Cl.⁷ .................................................. G02B 21/00
[52] U.S. Cl. ............................ 359/368; 359/389; 356/376
[58] Field of Search ..................................... 359/363, 368, 359/389, 232, 234, 235, 236; 356/376

[56] References Cited

U.S. PATENT DOCUMENTS

| | | | |
|---|---|---|---|
| 4,806,004 | 2/1989 | Wayland | 359/389 |
| 4,884,881 | 12/1989 | Lichtman | 359/227 |
| 5,225,671 | 7/1993 | Fukuyama | 250/216 |
| 5,248,876 | 9/1993 | Kerstens et al. | 250/561 |
| 5,428,475 | 6/1995 | Tanaami et al. | 359/368 |
| 5,612,818 | 3/1997 | Kumagai et al. | 359/385 |
| 5,731,894 | 3/1998 | Gross | 359/386 |
| 5,734,497 | 3/1998 | Yano et al. | 359/368 |
| 5,737,084 | 4/1998 | Ishihara | 356/376 |

*Primary Examiner*—Cassandra Spyrou
*Assistant Examiner*—Mark A. Robinson
*Attorney, Agent, or Firm*—Moonray Kojima

[57] ABSTRACT

A confocal microscopic equipment for measuring the solid shape of a sample at high speeds, and which does not require scanning of an irradiating light beam, wherein are provided a light source, apertures on which the output beam from the light source is irradited, an objective lens that forms stationary images of the apertures on the sample and collects the reflected or fluorescent light from the sample, a photo detector, and a beam splitter that makes the beam that has passed through the apertures incident to the objective lens by transmission or reflection and focuses the output beam from the objective lens on the photo detector by reflection or transmission.

10 Claims, 6 Drawing Sheets

(A)

(B)

CONFOCAL MICROSCOPIC EQUIPMENT

BACKGROUND OF THE INVENTION

1. Field of Invention

This invention relates to confocal microscopic equipment that can measure the solid shape of a sample at high speed; and more particularly, to equipment that does not require scanning of an irradiating beam.

2. Description of the Prior Art

The confocal microscopic equipment has resolution in the direction of an optical axis as well as resolution on a sample surface by scanning the irradiating beam on the sample and detecting light reflected from the sample through a pinhole or slit. The resolution in the direction of the optical axis obtained by detecting light through a slit is described in "Three-dimensional optical transfer function analysis for a laser scan fluorescence microscope with an extended detector" by S. Kawata, R. Arimoto, and O. Nakamura, J. Opt. Soc. Am. A. Vol 8, No. 1, (1991).

FIG. 1 shows a conventional confocal microscopic equipment, wherein an output light beam from laser 1 is made incident to galvo-scanner 2 and then a reflected beam from galvano-scanner 2 is made incident to beam splitter 4 via mirror 3. Beam splitter 4 reflects the incident beam from galvano-scanner 2 and makes the reflected light irradiate sample 6 via objective lens 5. The reflected light from sample 6 is again made incident to objective lens 5 and then made incident to one dimensional charge coupled device (CCD) camera 7 via beam splitter 4.

The operation of the FIG. 1 equipment will be described with reference to FIG. 2, which refers to each pixel of CCD camera 7. The output beam of laser 1 is scanned by galvano-scanner 2 and directed to scan sample 6 in a one dimensional direction. The reflected beam from sample 6, scanned in a one dimensional direction, is made incident to CCD camera 7. In CCD camera 7, the reflected beam scanning direction is set to match the direction marked "A" in FIG. 2. For example, the reflected beam is detected, for example, in turn with the pixels marked "B", "C", and "D" in FIG. 2. In this case, since each pixel can detect the reflected beam only in the range of the height of pixel marked "E" in FIG. 2, this means that the pixels detect substantially only the reflected beam that has passed through a slit of width "E".

That is to say, if it is assumed that the direction of the optical axis is the z-axis, the plane orthogonal to the optical axis is the x–y plane and the direction of scanning is the x-axis, then the equipment has resolution which is also in the z-axis direction. Thus, the fault shape of the x–z plane can be measured by scanning sample 6 in the z-axis direction. In addition, measurement of the solid shape of the sample 6 is made possible by scanning sample 6 in the z-axis direction while moving sample 6 in the y-axis direction in turn.

As a result, the resolution in the direction of the optical axis as well as the resolution on the sample surface can be obtained by scanning a laser beam in a one dimensional direction and by detecting the reflected light with a one dimensional line CCD camera 7.

However, there are problems one encounters when using conventional equipment in that expensive optical equipment such as a laser 1 is necessary and a scanning means such as a galvano-scanner 2 is required.

Moreover, there are other problems. For example, the wavelength becomes longer and the resolution worsens because the laser incorporated in the confocal microscopic equipment can be used only in a red color system due to size and price. Also, since the laser beam is a coherent light beam, speckle noise is generated, which degrades the signal to noise ratio (S/N).

SUMMARY OF THE INVENTION

Accordingly, an object of the invention is to overcome the aforementioned and other disadvantages, problems and deficiencies of the prior art.

Another object is to provide a confocal microscopic equipment which can measure the solid shape of a sample with high speed.

A further object is to provide a confocal microscopic equipment that does not require scanning of an irradiating beam.

DETAILED DESCRIPTION OF THE PREFERRED EMBODIMENTS

Figure 1:
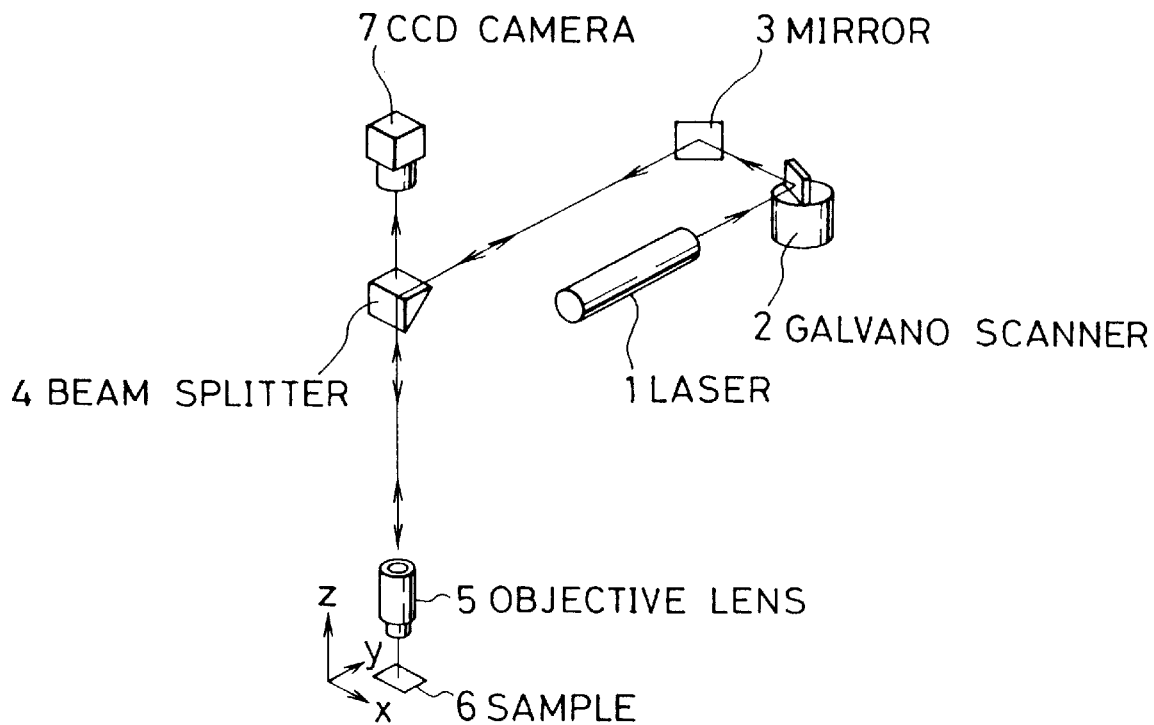
FIG. 1 is a diagram depicting a conventional confocal microscopic equipment.
Figure 2:
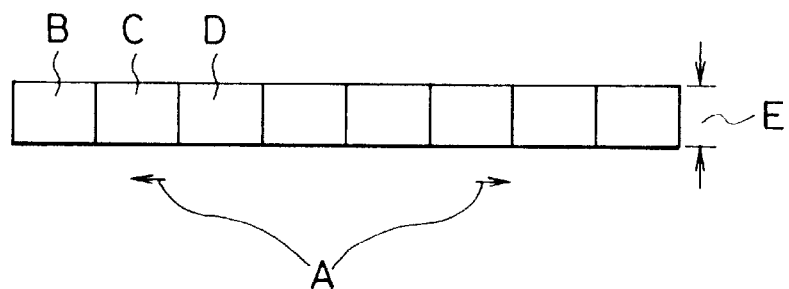
FIG. 2 is a diagram depicting the details of each pixel in the CCD camera shown in FIG. 1.
Figure 3:
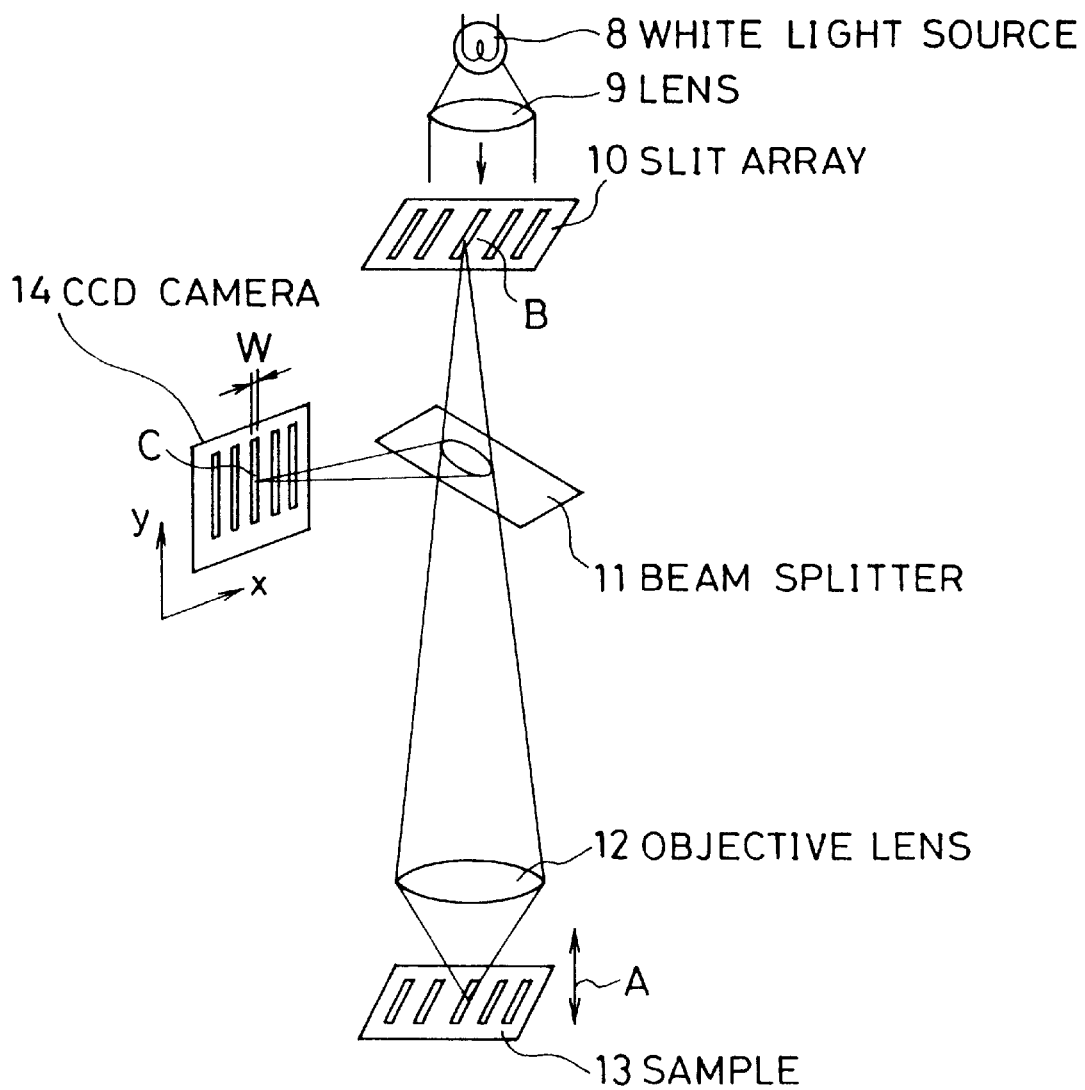
FIG. 3(A) is a diagram depicting an illustrative embodiment of the invention.
FIG. 3(B) is a graph of intensity and focal point.
Figure 3:
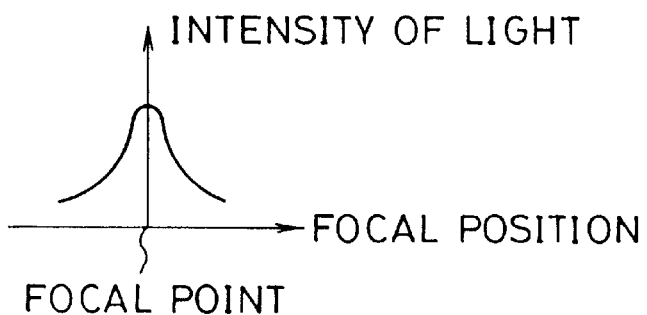

FIG. 3 shows a confocal microscopic equipment wherein an output beam from white light source 8, which is an incoherent light source, is made incident to slit-array 10 in which a plurality of slits, or apertures, are provided (called "slit array") through lens 9. The beams that pass through each slit of slit array 10 are made incident to beam splitter 11, such as a half mirror dichroic mirror. Beams that are transmitted through beam splitter 11 irradiate sample 13 through objective lens 12. The reflected beam from sample 13 is again made incident to beam splitter 11 through objective lens 12 and the beam reflected by beam splitter 11 is made incident to two dimensional CCD camera 14 which is a photo detector. Sample 13 is scanned in the direction of the optical axis (see double headed arror "A" in FIG. 3(A)) by means not shown in FIG. 3(A).

Operation of the embodiment of FIG. 3(A) is described with reference to FIG. 3(B). Slit array 10 is placed on the image forming plane of objective lens 12 and the slit width is the same as that of the Airy first dark band on the image forming plane. The distance between slits is about 10 times the foregoing slit width. If light is collected with a lens, actually it is not neatly focused into a point, but forms a fine image in which light and dark rings are arranged alternately surrounding the center light part. These rings are called "Airy disks" and the dark ring adjacent to the center part is the Airy first dark band, referred to above.

Let the width of the Airy first dark band be "b", wavelength be "λ" and the numerical aperture be "NA", then $$b=1.22\times\lambda/NA \quad (1)$$

For example, if it is assumed that the magnification of objective lens 12 is 100, the numerical apertures NA of objective lens 12=0.9 and λ=0.5 μm, then since the numerical apertures in the place of "B" in FIG. 3(A) becomes 1/100, $$B=1.22\times 0.5/(0.9/100)=68 \, \mu m \quad (2)$$

Therefore, a slit having such a width can be easily prepared by etching or other methods.

When the output beam of white light source 8 is made incident on slit array 10, a plurality of slit images of slit array 10 are formed on sample 13 by means of objective lens 12. The slit images on sample 13 are made incident on CCD camera 14. CCD camera 14 is a two dimensional CCD camera and multiple pixels are arranged on a plane. By considering the pixel array corresponding to the slit width, the camera detects only the reflected light passing through a slit of fixed width, as described before.

For example, the slit image marked "C" in FIG. 3(A) is measured by the pixel array in the place where the image is formed. If the width of the pixel array in the x-direction in FIG. 3(A) is assumed to be "W", the pixel array detects only the beam passing through the slit whose width is "W". Thus, the equipment has resolution in the direction of the optical axis as well as resolution on the sample surface. In this case, if the sample surface is located at the focal plane of objective lens 12, the slit images are clear. On the other hand, if sample 13 is moved upward or downward from the focal plane, such as by a means not shown in FIG. 3(A), the slit image will be out of focus.

If the slit images are detected by pixels of width "W", on CCD camera 14, a maximum intensity of light is made incident in the case where the focal position coincides with the focal plane as shown in FIG. 3(B). The incident intensity of light decreases as the focal position is shifted from the focal plane. In other words, the focal position in which the incident intensity of light becomes the maximum shows the height of the sample in the direction of the optical axis.

Figure 4:
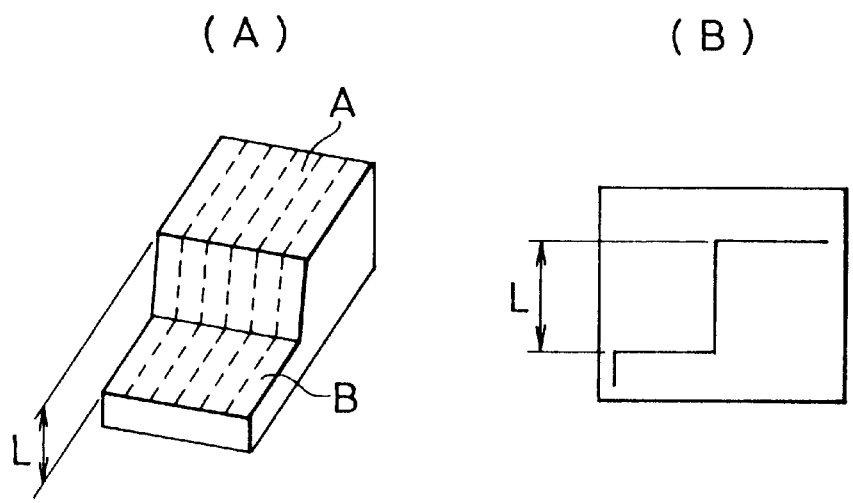
FIGS. 4(A) and 4(B) are a perspective view of a sample having a three dimensional shape and an image of a cross sectional view of a sample, respectively.

Accordingly, a change of the surface of sample 13 in the direction of the optical axis can be obtained in the following way. That is, the focal position at which the intensity of light measured by the CCD camera 14 becomes maximum is determined by scanning sample 13 in the direction of the optical axis marked "A" in FIG. 3(A) with a means not shown in FIG. 3(A). For example, if a sample of a three dimensional shape having a step "L" as shown in FIG. 4(A) is measured by the invention, slit images are formed as shown with the broken lines in FIG. 4(A). If the plane of surface "A" in FIG. 4(A) is the focal plane, the slit image of plane "B" in FIG. 4(A) will be out of focus. Conversely, if the plane of "B" in FIG. 4(A) is the focal plane, the slit image of plane "A" in FIG. 4(A) will be out of focus. Thus, a tomographic image, as shown in FIG. 4(B), can be produced by determining focal positions in which the maximum intensity of light is inputted to each pixel of CCD camera 14, respectively.

As a result, the resolution in the direction of the optical axis is obtained without scanning an irradiating beam using incoherent light. That is, this can be achieved by forming slit images on the sample surface and by determining, respectively, focal positions in which the maximum intensity of light is inputted to each pixel of CCD camera 14.

In addition, the equipment of the invention has resolution in the direction of the optical axis as well as resolution which is equivalent to that of an ordinary optical microscope in a direction orthogonal to the optical direction. Also, the objective lens 12 may focus fluorescence from sample 13. It is not limited to reflected beams from sample 13.

In the embodiment of FIG. 3(A), the transmitted beam through beam splitter 11 is focused on sample 13 and the reflected beam from beam splitter 11 is made incident on CCD camera 14. However, the reflected beam from beam splitter 11 may be focused on sample 13 and the transmitted beam through beam splitter 11 may be made incident to CCD camera 14.

In addition, if the slit width is increased, the intensity of light is increased and spatial resolution is decreased. On the other hand, if the slit width is decreased, the spatial resolution is improved but the intensity of light is decreased. Hence, the slit width need not be limited to the width of the first Airy first dark band, but, it is sufficient for the width to be from approximately 1/20 up to 20 times the width of the Airy first dark band, as determined by experimentation.

Similarly, if the pitch of the slits is increased, the resolution in the direction of the optical axis is improved because interference by adjacent slits is reduced but the number of slits that can be simultaneously measured is decreased. On the other hand, if the above distances are made smaller, the number of slits is increased and interference between the slits is generated, which makes correct measurement difficult to achieve. Therefore, the pitch of the slits is not limited to 10 times the Airy first dark band width, but is is sufficient for the distance to be about two or more times the Airy first dark band width, based on experimentation.

Furthermore, the photo detector is not limited to a CCD camera, but a camera tube, film or the like, may also be used and direct observation by the human eye using an ocular device can be adapted.

Figure 5:
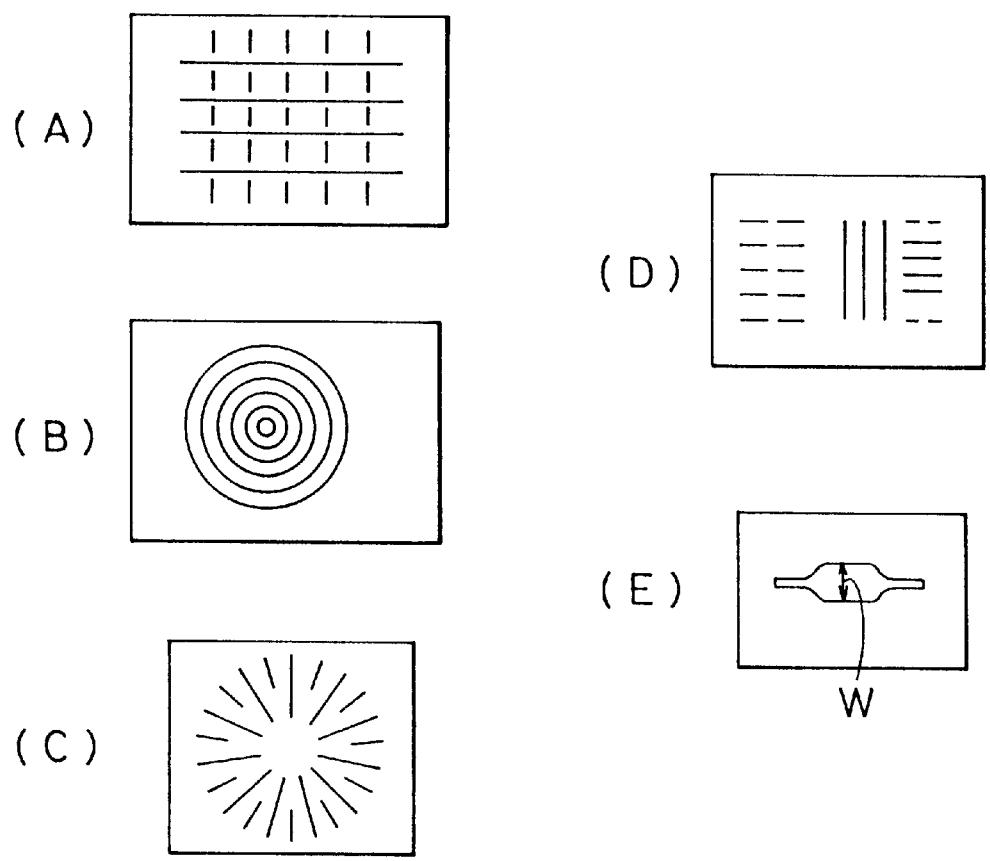
FIGS. 5(A)–5(E) are views depicting aperture shapes.

As shown in FIG. 5(A), the shape of the apertures is not limited to slits. For example, a reticulate shape can be arranged by using multiple slits orthogonal to each other. Such an aperature shape can measure the three dimensional shape of a sample more accurately. As shown in FIG. 5(B) a spherical shape can be adapted using a plurality of rings. Another shape is shown in FIG. 5(C) using radial slits. If the shape of the sample is known beforehand, an aperture shape, such as that shown in FIG. 5(D), can be used wherein the place requiring measurement is limited, for example. If the reflectively of the sample surface varies depending on the location thereof, the width of the slit "W" corresponding to places of small reflectivity may be made wider, as shown in FIG. 5(E).

If the apertures consist of pinholes of a diameter approximately the same as that of the Airy first dark band, coherent light can be used because speckle noise is not generated even if coherent light is used. The aperature may comprise an etched metal plate or a light shielding film formed on a glass substrate partially removed by etching. Also, the apertures may be made of a transmitting liquid crystal panel. In this case, such aperatures are especially effective because the shape of the aperatures can be electrically and conveniently changed.

If the shapes between the slits are to be measured, images between slits can be interpolated by moving slits in a direction orthogonal to the optical axis, obtaining multiple solid images, and composing them thereafter. In this case, a stage or the like on which a sample or slits are provided may be moved, or the measurements can be realized by moving the apertures, changing the shapes, etc by controlling the transmitting liquid crystal panel.

Figure 6:
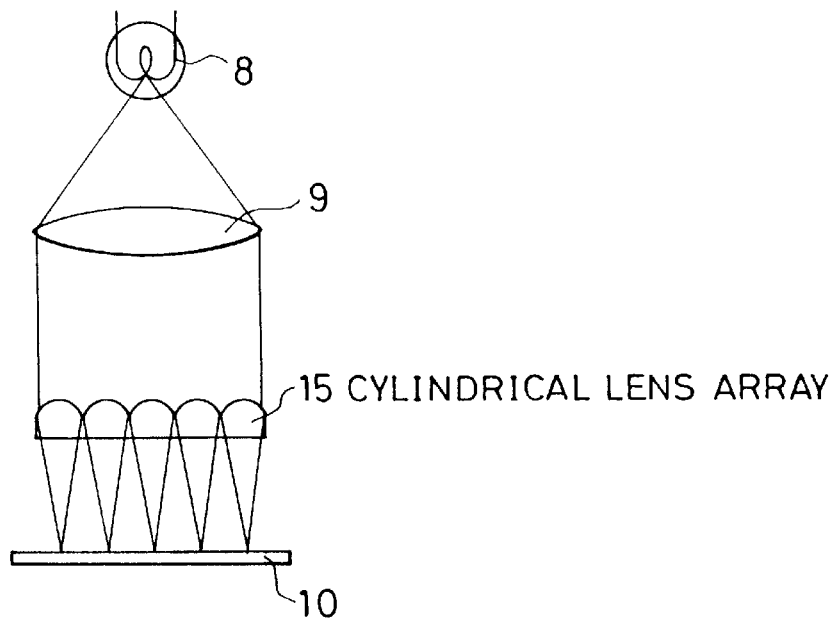
FIG. 6 is a diagram depicting another illustrative embodiment of the invention using a cylindrical lens array.

In the embodiment of FIG. 3(A), the ratio of slit width to slit interval is 1:10. This indicates that the ratio of aperture areas is 10%, and that only 10% of the incident beam is utilized. For this reason, the embodiment of FIG. 6 may be convenient and useful. The FIG. 6 embodiment comprises a white light source 8 which provides an output beam which is made incident on cylindrical lens array 15, which is a focusing means, through lens 9 and the beam is converged by cylindrical lens array 15 and made incident on each slit of slit array 10. Each slit of slit array 10 is placed at each focal point of the cylindrical lenses, respectively. By using the embodiment of FIG. 6, the incident beam can be effectively utilized. In addition, as the focusing means, both the ordinary convex lenses and Fresnel lenses and refractive index distributed lenses can be used. Furthermore, if a transmitting liquid cyrstal panel is used for the apertures, micro-lenses may be added to each liquid crystal element.

Figure 7:
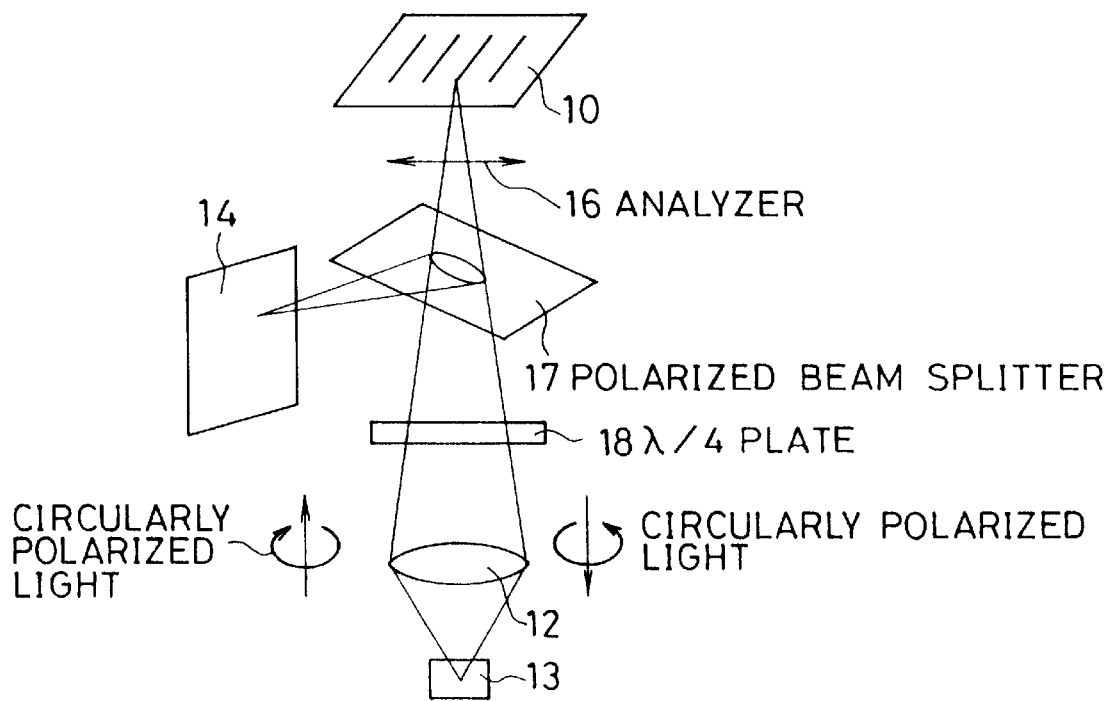
FIG. 7 is a diagram depicting a further illustrative embodiment of the invention using a polarized beam splitter.

The beam splitter 11 is shown as being a half mirror, but, a polarized beam splitter can also be used. FIG. 7 shows an illustrative embodiment using a polarized beam splitter. For example, polarizer 16 converts the transmitted beam to an S polarized light. Polarized beam splitter 17 transmits S polarized light and reflects P polarized light. The light passing slit array 10 becomes S polarized light by being transmitted through polarizer 16 and is made incident to polarized beam splitter 17. The S polarized light is made incident to quarter wave plate 18 after transmission through beam splitter 17. The incident light thus becomes circularly polarized light, which irradiates sample 13 through objective lens 12. The reflected light from sample 13 is again made incident to quarter wave plate 18 through objective lens 12. As a result, the circularly polarized light returns to linearly polarized light and is made incident to polarized beam splitter 17 as a 90 degree rotated P polarized light. Thus, the P polarized light is reflected by polarized beam splitter 17 and is made incident on CCD camera 14.

As a result, 100% of the incident light from slit array 10 can be made incident to the CCD camera, compared with the case where a half mirror is used.

The scanning of the sample 13 in the direction of the optical axis is done by moving the microscope using pulse motor or the like. However, sample 13 or slit array 10 may also be moved using piezoelectric elements. In addition, objective lens 12 may be moved in the direction of the optical axis. Although slit array 10 is mounted on the image forming plane of objective lens 12 in the embodiment of FIG. 3(A), an illuminating system for the microscopes can be used.

Figure 8:
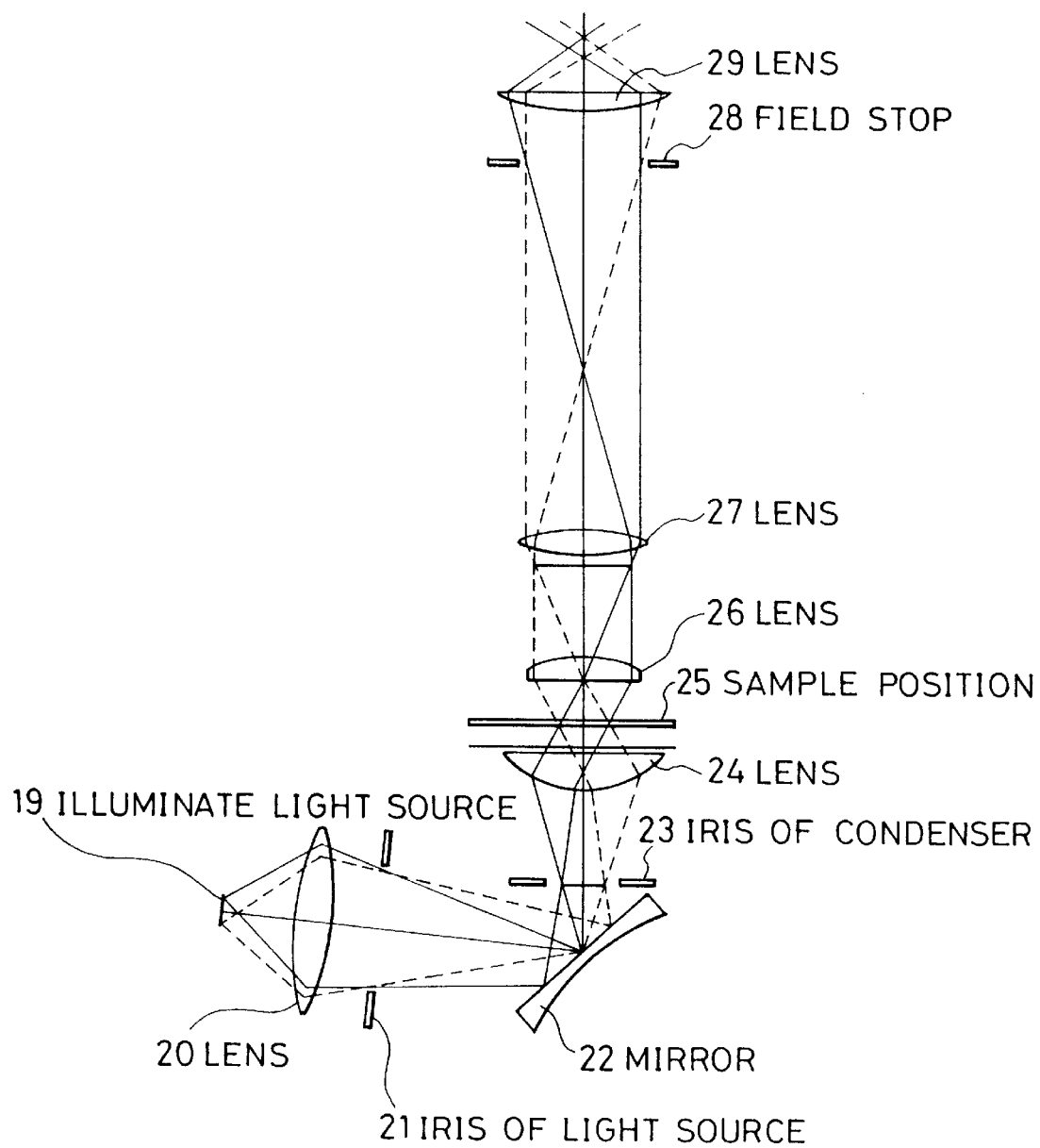
FIG. 8 is a diagram depicting another illustrative embodiment of the invention using an illuminating system of microscopes.

FIG. 8 shows an embodiment wherein an illuminating system of microscopes is used, wherein an output beam of illuminating light source 19 is focused with lens 20 and is made incident to mirror 22 through the iris of light source 21. This incident beam is reflected by mirror 22 and is then made incident on lens 24 through the iris of condenser 23. Light transmitted through lens 24 illuminates sample position 25 and is finally made incident to lens 29 through lenses 26 and 27 and field stop 28, respectively, and is then observed.

The operation of the embodiment of FIG. 8 is as follows. Since an image located in the position of the iris of light source 21 is formed on sample position 25, the apertures, such as slit arry 10, are provided in the position of the iris of the light source. Since the image of the apertures, such as slit array 10, is projected on sample position 25 in the foregoing manner, observation of the image using an ordinary ocular device or camera makes it possible to easily change an ordinary microscope into a confocal system. Although FIG. 8 illustrates a microscope having an illuminating system of transmitted light illumination, this concept is also applicable to an illuminating system of reflected lumination.

Figure 9:
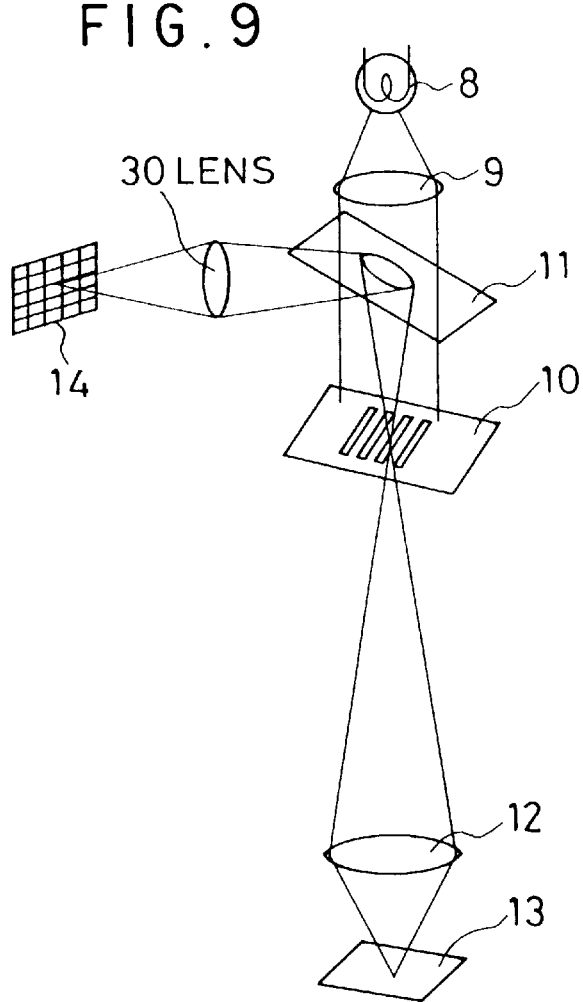
FIG. 9 is a diagram depicting a still further illustrative embodiment of the invention.

In FIGS. 3(A) and 7, the system has a configuration wherein the beam transmitted through slit array 10 is made incident on beam splitter 11 or polarized beam splitter 17. However, it may have the configuration shown in FIG. 9. The difference between the embodiments of FIGS. 9 and 3(A) is that in FIG. 9 the beam splitter 11 is located between light source 8 and slit array 10, whereas in FIG. 3(A), the beam splitter 11 is located between slit array 10 and sample 13. In addition, lens 30 becomes necessary in FIG. 9 to focus the branched light on CCD camera 14.

As described above, when the shapes between the slits are to be measured, the images between the slits are interpolated by composing cross sectional images obtained by moving slits in a direction orthogonal to the optical axis. This is because the distance between the slits is made to be about twice the width of the Airy first dark band or more to suppress interference between adjacent slits. However, the following method can also be used for this purpose.

Figure 10:
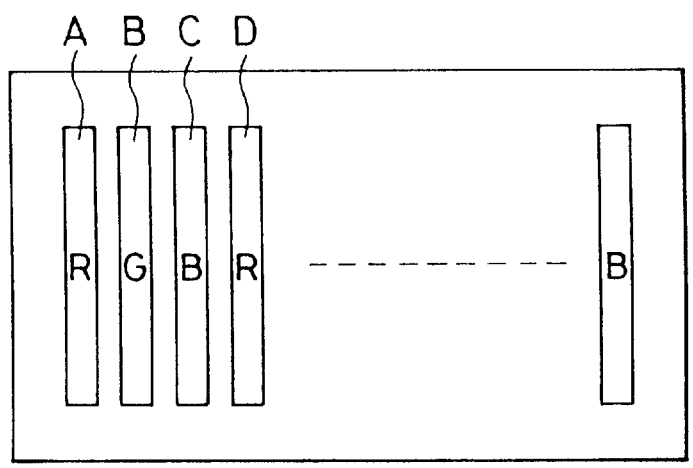
FIG. 10 is a view depicting slits to which color filters are attached.

As shown in FIG. 10, the slits to which different color filters are attached are located close to each other and the same color filters as relevant slits are also arranged on the CCD camera located on the photo detecting side. For example, in FIG. 10, red filters are attached to the slits marked "A" and "D", a green filter to the slit marked "B", and a blue filter to the slit marked "C". Interpolation between slits becomes possible by performing data processing for each filter color on the cross sectional images obtained in such embodiment. Thus, spatial resolution is improved three fold. In addition, filter colors are not limited to these three colors, but, a similar effect can also be obtained by using color liquid crystals as color filters and by using a color CCD camera.

The invention is not limited to usage as microscopes. The shapes of large sized objects, such as mechanical parts, can also be measured using an ordinary camera lense in the place of the objective lens. Advantageously, this invention provides a confocal microscopic equipment which does not require scanning of an irradiating beam. In the invention, slit images are formed on the sample surface, and the focal positions, in which the maximum intensity of light is inputted to each pixel of the CCD camera, are determined, respectively. Moreover, advantageously, in the invention which uses incoherent light as an irradiating beam the resolution is improved because of the spectral light components of shorter wavelengths, such as blue color, or ultra violet light can be used, without generating speckle noise.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A confocal microscopic equipment for measuring the shape of a sample, comprising:
   a light source for providing an output beam having parallel rays;
   a planar surface in which are defined a plurality of apertures through which said parallel rays of said output beam are directly and concurrently irradiated;

an objective lens which forms real stationary concurrent images of said plurality of apertures directly on at least one surface of said sample and focuses reflected beams reflected from said at least one surface of said sample;

means for moving said sample in an axial direction so that at least a part of said at least one surface is located at a focal plane of said objective lens;

a photo detector; and a beam splitter that transmits or reflects said parallel rays of said output beam passing directly and concurrently through said plurality of apertures and makes said parallel rays of said output beam directly incident on said objective lens, and makes said parallel rays of said output beam transmitted through said objective lens form concurrent real images of said at least one surface of said sample as defined through said plurality of apertures incident directly on said photo detector; wherein maximum intensity of light is detected by said photo detector when a focal position of said images of said plurality of apertures on said at least part of said at least one surface of said sample coincides with said focal plane so that depth of said at least one surface of said sample is detected by light intensity differing from said maximum intensity for real images of said plurality of apertures on said at least one surface of said sample which do not coincide with said focal point thereby effecting measurement of said solid shape of said sample without requiring a point by point scanning of the output beam from said light source irradiating said sample.

2. The equipment of claim 1, wherein said plurality of apertures have one or more of the following shapes: circular shape, rectangular shape, reticulate shape by arranging multiple orthogonal slits, multiple ring shape, and radial slit shape.

3. The equipment of claim 1, wherein said light source comprises an incoherent light source.

4. The equipment of claim 1, wherein said plurality of apertures are formed by etching a light shielding film formed on a metal plate or a glass substrate.

5. The equipment of claim 1, wherein said plurality of apertures comprise liquid crystal panels.

6. The equipment of claim 1, wherein said plurality of apertures are arranged at a pitch of two or more times the width thereof.

7. The equipment of claim 6, wherein images between adjacent ones of said plurality of apertures are combined and a composite thereof is obtained by composing a plurality of cross sectional images obtained by moving said plurality of apertures in a direction orthogonal to an optical axis.

8. The equipment of claim 1, wherein different color filters are attached to said plurality of apertures and said plurality of apertures are located close to each other.

9. The equipment of claim 1, further comprising focusing means located between said light source and said plurality of apertures for focusing an output beam from said light source onto said plurality of apertures.

10. The equipment of claim 1, wherein said reflected beam is light fluoresced by said sample when said output beam from said light source is made incident on said sample.

* * * * *